Jan. 25, 1938.　　　　W. H. FRANK　　　　2,106,565
ELECTRICAL DISTRIBUTION SYSTEM
Filed Jan. 9, 1936　　　2 Sheets-Sheet 1
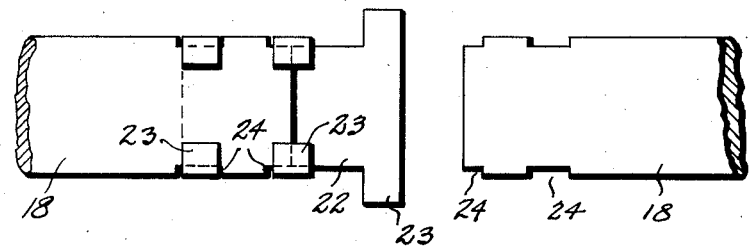
Fig. 1
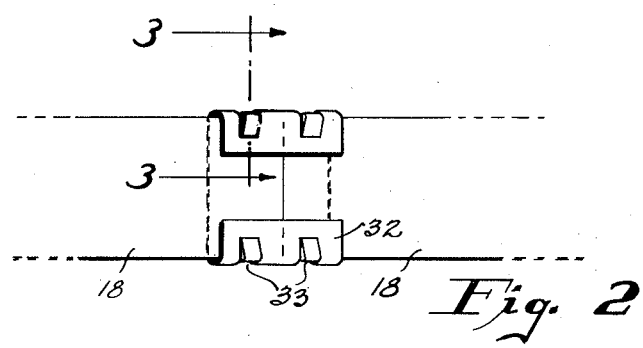
Fig. 2
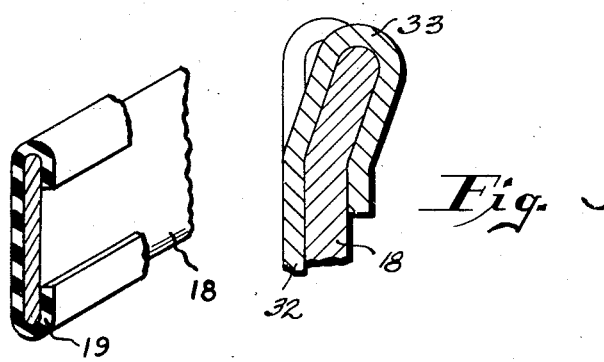
Fig. 3
Fig. 4
INVENTOR.
William H. Frank
BY Daniel G. Cullen
ATTORNEY.

Jan. 25, 1938.　　　　W. H. FRANK　　　　2,106,565
ELECTRICAL DISTRIBUTION SYSTEM
Filed Jan. 9, 1936　　　2 Sheets-Sheet 2

INVENTOR.
William H. Frank
BY Daniel B. Cullen
ATTORNEY.

Patented Jan. 25, 1938

2,106,565

UNITED STATES PATENT OFFICE 2,106,565

ELECTRICAL DISTRIBUTION SYSTEM

William H. Frank, Detroit, Mich.

Application January 9, 1936, Serial No. 58,307

2 Claims. (Cl. 191—30)

This application relates to electrical distribution systems and more particularly to details of construction of bus bars and insulation material of the ducts of such systems.

In prior applications, Serial No. 700,596, filed December 1, 1933 and issuing into a patent on December 31, 1935, Patent No. 2,025,813, and Serial No. 38,840, filed August 31, 1935, and Serial No. 723,053, filed April 30, 1934, there are disclosed electrical distribution systems of the duct and trolley type wherein the bus duct of the same contains bus rails, each of which is in the nature of a continuous elongated ribbon of electrically conducting material such as copper, and each of which is enfolded within a folded strip of insulating material such as fiber, all but a stripe on one of the flat surfaces of the bus bar ribbon being concealed by the insulating material, the exposed stripe forming a bus rail for the duct.

Inasmuch as it is necessary for purposes of manufacturing convenience to make the bus rails of lengths or sections spliced at their meeting ends so that the physical and electrical continuity of the bus rail will be preserved, bus splices of novel design have been provided, and these bus splices form the specific subject matter of this application.

The bus splices of this application have been so designed that the bus splicing means does not enlarge the cross section of the duct to an undesirable extent with the result that a continuous strip of insulation folded around a bus length may continue on to cover a spliced part of a bus run without interference and without creating problems of manufacture and installation within duct grooves, as might otherwise be the case if the splice means were otherwise constructed.

For an understanding of the splice means of this application reference should be had to the appended drawings. In these drawings, Fig. 1 is an exploded view of mating ends of bus bar provided with one form of splicing means of this application;

Fig. 2 shows mating ends of bus bar provided with a second form of splice means;

Fig. 3 is a cross section as if on line 3—3 of Fig. 2;

Fig. 4 is a fragmentary view of a bus run and its insulation;

Figure 5:
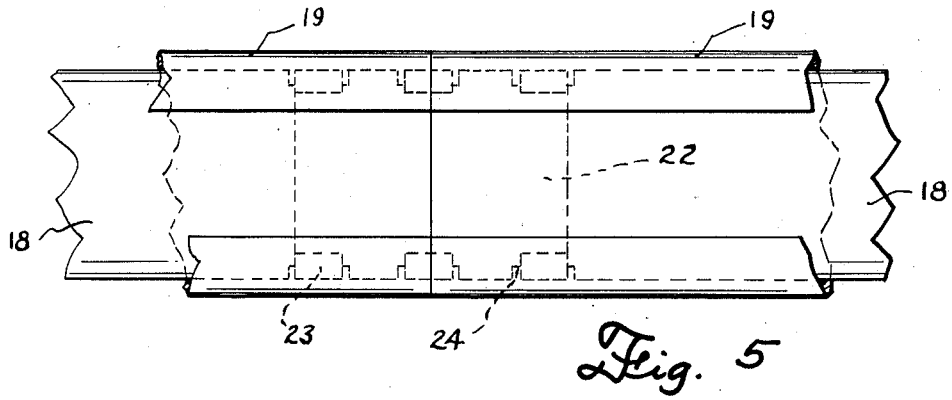
Figs. 5 and 6 show assemblies of bus bar and splice means and insulation, using the splice means of Figs. 1 and 2 respectively.
Figure 6:
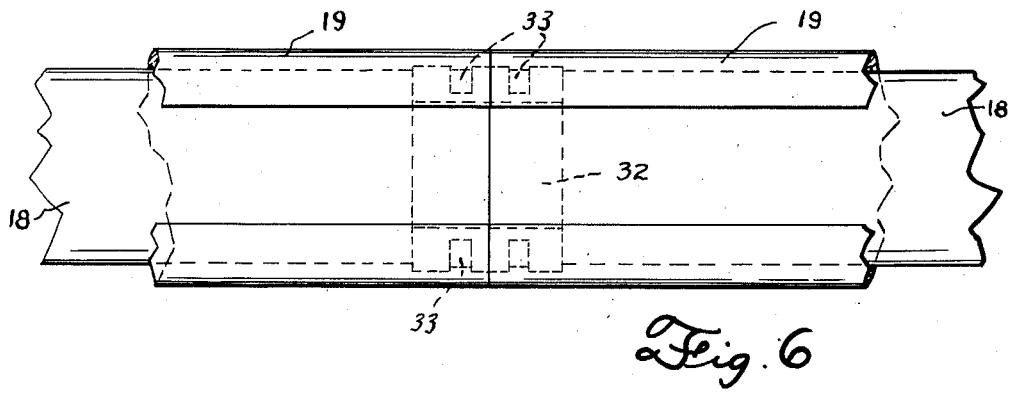

In the applications aforementioned there are disclosed sheet metal bus ducts formed with opposed beads providing facing grooves in which are disposed the edges of a compound ribbon of bus bar and insulation. The bus bar of each of these applications comprises a thin flat ribbon 18 of copper or the like and the insulation comprises a thin ribbon 19 of fiber or the like folded around the bus ribbon to conceal all of the same with the exception of a narrow exposed stripe on one of the flat surfaces of the bus ribbon. It is intended that in the manufacture of the duct the compound ribbon formed of bus bar and its insulation be fabricated as a unit with the insulation tightly folded around the bus ribbon, and it is intended that the compound ribbon be disposed in duct merely by inserting the same in partially or completely formed duct as the case may be. For this reason it is necessary that the insulation ribbon tightly enfold the bus ribbon.

Inasmuch as a bus ribbon is necessarily made up of sections or lengths, and inasmuch as these sections or lengths must be spliced in order to preserve not only the physical continuity of the bus run but what is more important the electrical continuity of the bus run, and inasmuch as the overall cross section of a compound ribbon at a splice must not be substantially greater than the overall cross section of the compound ribbon at a point remote from the splice, it is necessary that the bus splicing means be so designed that it does not create an excessive bulge within the insulation. For this reason the bus splices herein disclosed have been designed and have been found satisfactory in practice.

The bus splice means of Fig. 1, which is that disclosed in application Serial No. 723,053 as originally filed, includes a strap 22 of electrically conducting material such as copper formed of a width slightly less than that of the bus bar and provided with sets of tongues 23 adapted to be disposed within notches 24 formed in each meeting end of the bus bar.

When a bus splice is to be effected the meeting ends of the bus bar lengths are brought together and associated in a proper manner with a strap 22, whereupon the tongues 23 of the strap are aligned with the notches 24 of the bus bars and clinched over the same, substantially as disclosed, to form interlocking engagements between the meeting ends of the bus bar and the strap 22.

It is observed that the splice may be disposed within a folded strip of insulation 19 without creating an undue bulge in the same and particularly without substantially altering the cross section of the compound ribbon at the edges of the same, which edges determine the cooperation of the compound ribbon with the duct receiving it inasmuch as these edges are seated within the facing grooves provided by the beads of the duct.

The splice means of Figs. 2 and 3, which is that of application Serial No. 700,596 and Serial No. 38,840 includes a strap 32 of thin copper or the like which has its ends folded around the edges of the meeting ends of the bus bar lengths and which is crimped as indicated at two or more points 33 at each end of the same, one or more points registering with each bus bar length in interlocking engagement with crimps simultaneously formed in the edges of the bus bar lengths. These crimps may be formed by any suitable crimping tool and may be so provided that the cooperating deformations of the bus bar and of the strap are not only deformed from the bus bar and the strap but are also partially severed from the same, substantially as indicated in Fig. 3. Crimps of this character effectively interlock the strap and the bus bar lengths to one another and provide effective splices between meeting ends of the bus bar.

Because the strap 32 is made very thin and because the crimps are not deformed from the material to an undesirable extent, the spliced part of a bus run may be received within the insulation 19 and folded around the same without creating an undesirable and excessive bulge in such insulation.

It will be observed that the splice strap of each modification herein disclosed is so interlocked and so intimately associated with the cooperating portions of the bus bar lengths that an effective electrical bond between the meeting ends of bus bars is assured.

Now having described the bus splices of this application, reference should be had to the claims which follow for a determination of the monopoly sought herein.

I claim:

1. A continuous bus run comprising lengths of thin, wide, flat bus ribbon joined end to end by splice means comprising thin, wide, flat C straps having their longitudinal edges folded over longitudinal edges of bus ribbon, the edges of the straps being spaced apart a considerable distance, the folds of the straps having formations interlocking with cooperating formations of the longitudinal edges of the bus ribbon, and a thin, wide, flat ribbon of insulation material folded around the bus ribbon with its edge portions being directed towards each other so as to lie substantially alongside of the bus ribbon so as to cover all but a narrow stripe on one flat side of the bus ribbon, the external dimensions of the folded splice straps being substantially no greater than the external dimensions of the bus ribbon at points remote from the splices, the insulator enclosing the splice straps, with the gaps between the edges of the splice straps registering with the gap between the edges of the insulation ribbon and with the longitudinal edges of the insulation being alined with the longitudinal edges of the splice straps.

2. A continuous bus run comprising lengths of thin, wide, flat bus ribbon joined end to end by splice means comprising thin, wide, flat C straps having their longitudinal edges folded over longitudinal edges of bus ribbon, the edges of the straps being spaced apart a considerable distance, the folds of the straps having formations interlocking with cooperating formations of the longitudinal edges of the bus ribbon, and a thin, wide, flat ribbon of insulation material folded around the bus ribbon with its edge portions being directed towards each other so as to lie substantially alongside of the bus ribbon so as to cover all but a narrow stripe on one flat side of the bus ribbon, and enclosing the splice straps, with the gaps between the edges of the splice straps registering with the gap between the edges of the insulation ribbon and with the longitudinal edges of the insulation being alined with the longitudinal edges of the splice straps.

WILLIAM H. FRANK.